US009230085B1

(12) United States Patent
Paczkowski et al.

(10) Patent No.: US 9,230,085 B1
(45) Date of Patent: Jan. 5, 2016

(54) NETWORK BASED TEMPORARY TRUST EXTENSION TO A REMOTE OR MOBILE DEVICE ENABLED VIA SPECIALIZED CLOUD SERVICES

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/446,330

(22) Filed: Jul. 29, 2014

(51) Int. Cl.
G06F 21/34 (2013.01)
(52) U.S. Cl.
CPC ..................... G06F 21/34 (2013.01)
(58) Field of Classification Search
CPC ....... G06F 9/5077; G06F 21/53; G06F 21/31; G06F 21/34; G06F 21/50; G06F 2009/45587; H04L 63/08
USPC ...................................... 726/22–25
See application file for complete search history.

(56) References Cited

U.S. PATENT DOCUMENTS

| 5,303,378 | A | 4/1994 | Cohen |
| 5,321,735 | A | 6/1994 | Breeden et al. |
| 5,764,889 | A | * | 6/1998 | Ault et al. ................ 726/17 |
| 5,796,952 | A | 8/1998 | Davis et al. |
| 6,131,024 | A | 10/2000 | Boltz |
| 6,177,860 | B1 | 1/2001 | Cromer et al. |
| 6,219,712 | B1 | 4/2001 | Mann et al. |
| 6,363,150 | B1 | 3/2002 | Bhagavath et al. |
| 6,477,180 | B1 | 11/2002 | Aggarwal et al. |

(Continued)

FOREIGN PATENT DOCUMENTS

| WO | WO2011025433 A1 | 3/2011 |
| WO | WO2012064171 A1 | 5/2012 |

(Continued)

OTHER PUBLICATIONS

FAIPP Pre-Interview Communication dated Mar. 20, 2014, U.S. Appl. No. 13/482,731, filed May 29, 2012.

(Continued)

*Primary Examiner* — Catherine Thiaw

(57) ABSTRACT

A method of executing a trusted application on a trusted security zone enabled electronic device. The method comprises responsive to a trusted security subzone not being provisioned on the electronic device, generating, by a server, a temporary trust token, transmitting the temporary trust token to the electronic device, and comparing the temporary trust token with a plurality of trust tokens stored in the electronic device to determine the trustworthiness of the temporary trust token. The method further comprises responsive to the temporary trust token being determined to be trustworthy, provisioning the non-provisioned trusted security subzone on the electronic device to be a temporary trust enablement, transmitting the trusted application through an encrypted channel to the temporary trust enablement, executing the trusted application in the temporary trust enablement, and removing the trusted application, the temporary trust enablement, and the temporary trust token when the trusted application is completed.

13 Claims, 8 Drawing Sheets

(56) References Cited

U.S. PATENT DOCUMENTS

| | | | |
|---|---|---|---|
| 6,507,904 B1 * | 1/2003 | Ellison et al. | 712/229 |
| 6,614,893 B1 | 9/2003 | Paiz | |
| 6,668,322 B1 | 12/2003 | Wood et al. | |
| 6,691,230 B1 | 2/2004 | Bardon | |
| 6,754,784 B1 | 6/2004 | North et al. | |
| 6,823,454 B1 | 11/2004 | Hind et al. | |
| 6,824,064 B2 | 11/2004 | Guthery et al. | |
| 6,895,234 B1 | 5/2005 | Laursen et al. | |
| 7,043,241 B1 | 5/2006 | Sladek et al. | |
| 7,366,806 B2 | 4/2008 | Milenkovic et al. | |
| 7,387,240 B2 | 6/2008 | Ziegler | |
| 7,519,824 B1 | 4/2009 | Peyravian et al. | |
| 7,552,467 B2 | 6/2009 | Lindsay | |
| 7,571,364 B2 | 8/2009 | Whetsel | |
| 7,650,645 B1 | 1/2010 | Langendorf et al. | |
| 7,716,720 B1 | 5/2010 | Marek et al. | |
| 7,873,837 B1 | 1/2011 | Lee et al. | |
| 7,895,642 B1 | 2/2011 | Larson et al. | |
| 7,921,303 B2 | 4/2011 | Mauro, II | |
| 8,060,449 B1 | 11/2011 | Zhu | |
| 8,073,428 B2 | 12/2011 | Khetawat et al. | |
| 8,086,238 B1 | 12/2011 | Kosar | |
| 8,112,794 B2 | 2/2012 | Little et al. | |
| 8,190,919 B2 | 5/2012 | Natarajan et al. | |
| 8,204,480 B1 | 6/2012 | Lindteigen et al. | |
| 8,238,823 B2 | 8/2012 | Maugars et al. | |
| 8,271,336 B2 | 9/2012 | Mikurak | |
| 8,316,237 B1 | 11/2012 | Felsher et al. | |
| 8,402,543 B1 | 3/2013 | Ranjan et al. | |
| 8,413,229 B2 | 4/2013 | Mullick et al. | |
| 8,429,409 B1 | 4/2013 | Wall et al. | |
| 8,443,420 B2 | 5/2013 | Brown et al. | |
| 8,447,983 B1 | 5/2013 | Beck et al. | |
| 8,494,576 B1 | 7/2013 | Bye et al. | |
| 8,504,097 B1 | 8/2013 | Cope et al. | |
| 8,588,749 B1 | 11/2013 | Sadhvani et al. | |
| 8,631,247 B2 | 1/2014 | O'Loughlin et al. | |
| 8,632,000 B2 | 1/2014 | Laracey | |
| 8,649,770 B1 | 2/2014 | Cope et al. | |
| 8,667,607 B2 | 3/2014 | Paczkowski et al. | |
| 8,707,056 B2 | 4/2014 | Felton | |
| 8,712,407 B1 | 4/2014 | Cope et al. | |
| 8,718,554 B2 | 5/2014 | Abel | |
| 8,719,586 B1 | 5/2014 | Paleja et al. | |
| 8,726,343 B1 | 5/2014 | Borzycki et al. | |
| 8,738,333 B1 | 5/2014 | Behera et al. | |
| 8,750,839 B1 | 6/2014 | Paczkowski et al. | |
| 8,752,140 B1 | 6/2014 | Paczkowski et al. | |
| 8,762,298 B1 | 6/2014 | Ranjan et al. | |
| 8,787,873 B1 | 7/2014 | Hitt et al. | |
| 8,793,808 B2 | 7/2014 | Boccon-Gibod | |
| 8,797,875 B2 | 8/2014 | Garcia Martin et al. | |
| 8,811,971 B2 | 8/2014 | Corda et al. | |
| 8,831,998 B1 | 9/2014 | Cramer et al. | |
| 8,839,460 B2 | 9/2014 | Shirlen et al. | |
| 8,850,568 B2 | 9/2014 | Shirlen et al. | |
| 8,856,600 B2 | 10/2014 | Zadigian et al. | |
| 8,862,181 B1 | 10/2014 | Cope et al. | |
| 8,863,252 B1 | 10/2014 | Katzer et al. | |
| 8,881,977 B1 | 11/2014 | Paczkowski et al. | |
| 8,886,925 B2 | 11/2014 | Qureshi et al. | |
| 8,954,588 B1 | 2/2015 | Bertz et al. | |
| 8,984,592 B1 | 3/2015 | Paczkowski et al. | |
| 8,989,705 B1 | 3/2015 | Katzer et al. | |
| 9,015,068 B1 | 4/2015 | Bertz et al. | |
| 9,021,585 B1 | 4/2015 | Paczkowski et al. | |
| 9,027,102 B2 | 5/2015 | Katzer et al. | |
| 9,049,013 B2 | 6/2015 | Paczkowski et al. | |
| 9,049,186 B1 | 6/2015 | Paczkowski et al. | |
| 9,066,230 B1 | 6/2015 | Paczkowski et al. | |
| 9,069,952 B1 | 6/2015 | Paczkowski et al. | |
| 9,104,840 B1 | 8/2015 | Paczkowski et al. | |
| 9,118,655 B1 | 8/2015 | Paczkowski et al. | |
| 2001/0041591 A1 | 11/2001 | Carroll | |
| 2002/0035697 A1 | 3/2002 | McCurdy et al. | |
| 2002/0091569 A1 | 7/2002 | Kitaura et al. | |
| 2002/0095389 A1 | 7/2002 | Gaines | |
| 2002/0156911 A1 | 10/2002 | Croman et al. | |
| 2002/0166070 A1 | 11/2002 | Mualem et al. | |
| 2002/0174344 A1 | 11/2002 | Ting | |
| 2002/0181503 A1 | 12/2002 | Montgomery, Jr. | |
| 2002/0184325 A1 | 12/2002 | Killcommons et al. | |
| 2002/0194361 A1 | 12/2002 | Itoh et al. | |
| 2002/0194496 A1 | 12/2002 | Griffin et al. | |
| 2003/0045273 A1 | 3/2003 | Pyhalammi et al. | |
| 2003/0093667 A1 | 5/2003 | Dutta et al. | |
| 2003/0110046 A1 | 6/2003 | Cofta | |
| 2003/0126225 A1 | 7/2003 | Camble et al. | |
| 2003/0172163 A1 | 9/2003 | Fujita et al. | |
| 2003/0216143 A1 | 11/2003 | Roese et al. | |
| 2003/0229514 A2 | 12/2003 | Brown | |
| 2003/0237002 A1 | 12/2003 | Oishi et al. | |
| 2004/0158840 A1 | 8/2004 | Rothman et al. | |
| 2004/0202328 A1 | 10/2004 | Hara | |
| 2004/0233844 A1 | 11/2004 | Yu et al. | |
| 2004/0234049 A1 | 11/2004 | Melideo | |
| 2004/0243810 A1 | 12/2004 | Rindborg et al. | |
| 2005/0015601 A1 | 1/2005 | Tabi | |
| 2005/0045719 A1 | 3/2005 | Yang | |
| 2005/0052994 A1 | 3/2005 | Lee | |
| 2005/0091505 A1 | 4/2005 | Riley et al. | |
| 2005/0123596 A1 | 6/2005 | Kohane et al. | |
| 2005/0125396 A1 | 6/2005 | Liu | |
| 2005/0138433 A1 | 6/2005 | Linetsky | |
| 2005/0181796 A1 | 8/2005 | Kumar et al. | |
| 2005/0228892 A1 | 10/2005 | Riley et al. | |
| 2005/0235166 A1 | 10/2005 | England et al. | |
| 2005/0239481 A1 | 10/2005 | Seligmann | |
| 2005/0272445 A1 | 12/2005 | Zellner | |
| 2005/0289355 A1 | 12/2005 | Kitariev et al. | |
| 2006/0030291 A1 | 2/2006 | Dawson et al. | |
| 2006/0036851 A1 | 2/2006 | DeTreville | |
| 2006/0040641 A1 | 2/2006 | Dawson et al. | |
| 2006/0129488 A1 | 6/2006 | Vincent | |
| 2006/0156026 A1 | 7/2006 | Utin | |
| 2006/0164978 A1 | 7/2006 | Werner et al. | |
| 2006/0171537 A1 | 8/2006 | Enright | |
| 2006/0190605 A1 | 8/2006 | Franz et al. | |
| 2006/0212853 A1 | 9/2006 | Sutardja | |
| 2006/0224901 A1 | 10/2006 | Lowe | |
| 2006/0245438 A1 | 11/2006 | Sajassi et al. | |
| 2006/0258289 A1 | 11/2006 | Dua | |
| 2006/0259790 A1 | 11/2006 | Asokan et al. | |
| 2006/0261949 A1 | 11/2006 | Kim et al. | |
| 2006/0277307 A1 | 12/2006 | Bernardin et al. | |
| 2006/0277433 A1 | 12/2006 | Largman et al. | |
| 2007/0011061 A1 | 1/2007 | East | |
| 2007/0038648 A1 | 2/2007 | Chetwood et al. | |
| 2007/0061535 A1 | 3/2007 | Xu et al. | |
| 2007/0078988 A1 | 4/2007 | Miloushev et al. | |
| 2007/0079120 A1 | 4/2007 | Bade et al. | |
| 2007/0094273 A1 | 4/2007 | Fritsch et al. | |
| 2007/0094691 A1 | 4/2007 | Gazdzinski | |
| 2007/0118880 A1 | 5/2007 | Mauro, II | |
| 2007/0143210 A1 | 6/2007 | Yeung et al. | |
| 2007/0162759 A1 | 7/2007 | Buskey et al. | |
| 2007/0167167 A1 | 7/2007 | Jiang | |
| 2007/0177771 A1 | 8/2007 | Tanaka et al. | |
| 2007/0180120 A1 | 8/2007 | Bainbridge et al. | |
| 2007/0186212 A1 | 8/2007 | Mazzaferri et al. | |
| 2007/0197261 A1 | 8/2007 | Humbel | |
| 2007/0214332 A1 | 9/2007 | Sonoda et al. | |
| 2007/0276969 A1 | 11/2007 | Bressy et al. | |
| 2007/0277223 A1 | 11/2007 | Datta et al. | |
| 2008/0005794 A1 | 1/2008 | Inoue et al. | |
| 2008/0014867 A1 | 1/2008 | Finn | |
| 2008/0020745 A1 | 1/2008 | Bae et al. | |
| 2008/0022374 A1 | 1/2008 | Brown et al. | |
| 2008/0051142 A1 | 2/2008 | Calvet et al. | |
| 2008/0092213 A1 | 4/2008 | Wei et al. | |
| 2008/0097793 A1 | 4/2008 | Dicks et al. | |
| 2008/0108321 A1 | 5/2008 | Taaghol et al. | |
| 2008/0109662 A1 | 5/2008 | Natarajan et al. | |
| 2008/0121687 A1 | 5/2008 | Buhot | |

(56) References Cited

U.S. PATENT DOCUMENTS

| | | |
|---|---|---|
| 2008/0146280 A1 | 6/2008 | Sasse et al. |
| 2008/0155271 A1* | 6/2008 | Barck et al. .............. 713/189 |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1* | 5/2009 | Accapadi et al. ............ 700/28 |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0227290 A1 | 9/2009 | Chien |
| 2009/0248445 A1 | 10/2009 | Harnick |
| 2009/0271321 A1 | 10/2009 | Stafford |
| 2009/0281947 A1 | 11/2009 | Erel |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |

(56) References Cited

U.S. PATENT DOCUMENTS

| | | | |
|---|---|---|---|
| 2012/0303961 A1 | 11/2012 | Kean et al. | |
| 2012/0304286 A1 | 11/2012 | Croll et al. | |
| 2012/0309345 A1 | 12/2012 | Wake et al. | |
| 2012/0324293 A1 | 12/2012 | Grube et al. | |
| 2012/0329425 A1 | 12/2012 | Velusamy et al. | |
| 2013/0014259 A1 | 1/2013 | Gribble et al. | |
| 2013/0019323 A1* | 1/2013 | Arvidsson et al. | 726/30 |
| 2013/0031374 A1 | 1/2013 | Thom et al. | |
| 2013/0034081 A1 | 2/2013 | Ban et al. | |
| 2013/0035056 A1 | 2/2013 | Prasad et al. | |
| 2013/0047197 A1 | 2/2013 | Saroiu et al. | |
| 2013/0054474 A1 | 2/2013 | Yeager | |
| 2013/0062417 A1 | 3/2013 | Lee et al. | |
| 2013/0067552 A1 | 3/2013 | Hawkes et al. | |
| 2013/0074067 A1 | 3/2013 | Chowdhry | |
| 2013/0086385 A1 | 4/2013 | Poeluev | |
| 2013/0086684 A1 | 4/2013 | Mohler | |
| 2013/0097302 A9 | 4/2013 | Khedouri et al. | |
| 2013/0097657 A1 | 4/2013 | Cardamore et al. | |
| 2013/0105565 A1 | 5/2013 | Kamprath | |
| 2013/0109307 A1 | 5/2013 | Reisgies et al. | |
| 2013/0111095 A1 | 5/2013 | Mehrotra et al. | |
| 2013/0117186 A1 | 5/2013 | Weinstein et al. | |
| 2013/0124583 A1 | 5/2013 | Ferguson et al. | |
| 2013/0125114 A1 | 5/2013 | Frascadore | |
| 2013/0136126 A1 | 5/2013 | Wang et al. | |
| 2013/0138521 A1 | 5/2013 | Want et al. | |
| 2013/0138959 A1 | 5/2013 | Pelly et al. | |
| 2013/0140360 A1 | 6/2013 | Graylin | |
| 2013/0143489 A1 | 6/2013 | Morris et al. | |
| 2013/0145429 A1 | 6/2013 | Mendel et al. | |
| 2013/0159021 A1 | 6/2013 | Felsher | |
| 2013/0159186 A1 | 6/2013 | Brudnicki et al. | |
| 2013/0159710 A1 | 6/2013 | Khan | |
| 2013/0160120 A1 | 6/2013 | Malaviya et al. | |
| 2013/0174147 A1 | 7/2013 | Sahita et al. | |
| 2013/0175984 A1 | 7/2013 | Yamazaki et al. | |
| 2013/0191632 A1 | 7/2013 | Spector et al. | |
| 2013/0212704 A1 | 8/2013 | Shablygin et al. | |
| 2013/0262264 A1 | 10/2013 | Karstoft | |
| 2013/0263212 A1 | 10/2013 | Faltyn et al. | |
| 2013/0290709 A1 | 10/2013 | Muppidi et al. | |
| 2013/0305333 A1 | 11/2013 | Katzer et al. | |
| 2013/0310003 A1 | 11/2013 | Sadhvani et al. | |
| 2013/0332456 A1 | 12/2013 | Arkin | |
| 2013/0343181 A1 | 12/2013 | Stroud et al. | |
| 2013/0345530 A1 | 12/2013 | McRoberts et al. | |
| 2013/0347064 A1* | 12/2013 | Aissi | 726/2 |
| 2013/0347103 A1 | 12/2013 | Veteikis et al. | |
| 2014/0007182 A1* | 1/2014 | Qureshi et al. | 726/1 |
| 2014/0007222 A1 | 1/2014 | Qureshi et al. | |
| 2014/0047548 A1 | 2/2014 | Bye et al. | |
| 2014/0059642 A1 | 2/2014 | Deasy et al. | |
| 2014/0074508 A1 | 3/2014 | Ying et al. | |
| 2014/0089243 A1 | 3/2014 | Oppenheimer | |
| 2014/0089699 A1 | 3/2014 | O'Connor et al. | |
| 2014/0104287 A1 | 4/2014 | Nalluri et al. | |
| 2014/0106709 A1 | 4/2014 | Palamara et al. | |
| 2014/0141718 A1 | 5/2014 | Stromberg et al. | |
| 2014/0155025 A1 | 6/2014 | Parker et al. | |
| 2014/0173747 A1 | 6/2014 | Govindaraju | |
| 2014/0188738 A1 | 7/2014 | Huxham | |
| 2014/0215196 A1 | 7/2014 | Berlin | |
| 2014/0245444 A1 | 8/2014 | Lutas et al. | |
| 2014/0254381 A1 | 9/2014 | Sandor et al. | |
| 2014/0267332 A1 | 9/2014 | Siddhartha et al. | |
| 2014/0279558 A1 | 9/2014 | Kadi et al. | |
| 2014/0281544 A1 | 9/2014 | Paczkowski et al. | |
| 2014/0298026 A1* | 10/2014 | Isozaki et al. | 713/171 |
| 2015/0106805 A1* | 4/2015 | Melander et al. | 718/1 |
| 2015/0169885 A1 | 6/2015 | Paczkowski et al. | |
| 2015/0172928 A1 | 6/2015 | Katzer et al. | |

FOREIGN PATENT DOCUMENTS

| | | |
|---|---|---|
| WO | 2013170228 A2 | 11/2013 |
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Notice of Allowance dated May 27, 2014, U.S. Appl. No. 13/482,731, filed May 29, 2012.

FAIPP Pre-Interview Communication dated Oct. 24, 2012, U.S. Appl. No. 13/463,797, filed May 3, 2012.

Notice of Allowance dated Mar. 1, 2013, U.S. Appl. No. 13/463,797, filed May 3, 2012.

FAIPP Pre-Interview Communication dated Jun. 12, 2013, U.S. Appl. No. 13/440,980, filed Apr. 5, 2012.

Final Office Action dated Sep. 9, 2013, U.S. Appl. No. 13/440,980, filed Apr. 5, 2012.

Notice of Allowance dated Nov. 29, 2013, U.S. Appl. No. 13/440,980, filed Apr. 5, 2012.

FAIPP Pre-Interview Communication dated Oct. 24, 2012, U.S. Appl. No. 13/463,801, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

Final Office Action dated Mar. 27, 2014, U.S. Appl. No. 13/470,203, filed May 11, 2012.

Advisory Action dated May 29, 2014, U.S. Appl. No. 13/470,203, filed May 11, 2012.

FAIPP Pre-Interview Communication dated May 12, U.S. Appl. No. 13/294,177, filed Nov. 11, 2011.

FAIPP Pre-Interview Communication dated Jun. 6, 2013, U.S. Appl. No. 13/571,348, filed Aug. 10, 2012.

Office Action dated Sep. 25, 2013, U.S. Appl. No. 13/571,348, filed Aug. 10, 2012.

Final Office Action dated Apr. 10, 2014, U.S. Appl. No. 13/571,348, filed Aug. 10, 2012.

Advisory Action dated Jun. 23, 2014, U.S. Appl. No. 13/571,348, filed Aug. 10, 2012.

Notice of Allowance dated Aug. 30, 2013; U.S. Appl. No. 13/540,437, filed Jul. 2, 2012.

Restriction Requirement dated Nov. 1, 2013, U.S. Appl. No. 13/557,213, filed Jul. 25, 2012.

Office Action dated Dec. 19, 2013, U.S. Appl. No. 13/557,213, filed Jul. 25, 2012.

Notice of Allowance dated Jun. 4, 2014, U.S. Appl. No. 13/557,213, filed Jul. 25, 2012.

FAIPP Pre-Interview Communication dated Nov. 27, 2013, U.S. Appl. No. 13/610,856, filed Sep. 11, 2012.

Notice of Allowance date Jan. 31, 2014, U.S. Appl. No. 13/610,856, filed Sep. 11, 2012.

FAIPP Pre-Interview Communication dated Jun. 5, 2013, U.S. Appl. No. 13/556,200, filed Jul. 24, 2012.

First Action Interview Office Action dated Aug. 19, 2013, U.S. Appl. No. 13/556,200, filed Jul. 24, 2012.

Notice of Allowance dated Oct. 16, 2013, U.S. Appl. No. 13/556,200, filed Jul. 24, 2012.

FAIPP Pre-Interview Communication dated Aug. 4, 2014, U.S. Appl. No. 13/844,357, filed Mar. 15, 2013.

FAIPP Pre-Interview Communication dated Apr. 3, 2014, U.S. Appl. No. 13/802,383, filed Mar. 13, 2013.

First Action Interview Office Action dated May 23, 2014, U.S. Appl. No. 13/802,383, filed Mar. 13, 2013.

Notice of Allowance dated Jul. 8, 2014, U.S. Appl. No. 13/802,383, filed Mar. 13, 2013.

Restriction Requirement dated Aug. 14, 2014, U.S. Appl. No. 13/594,777, filed Aug. 25, 2012.

FAIPP Pre-Interview Communication dated Jul. 17, 2014, U.S. Appl. No. 13/594,778, filed Aug. 25, 2012.

(56) References Cited

OTHER PUBLICATIONS

FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Search Report and Written Opinion, dated Apr. 22, 2014, PCT/US13/53617, filed on Aug. 5, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014.
Cope, Warren B., et al., "Electronic Purchase Transaction Trust Infrastructure", filed May 29, 2012, U.S. Appl. No. 13/482,731.
Katzer, Robin D., et al., "Secure Placement of Centralized Media Controller Application in Mobile Access Terminal", filed Nov. 11, 2011, U.S. Appl. No. 13/294,177.
Paczkowski, Lyle W., et al., "Trusted Policy and Charging Enforcement Function", filed Jun. 27, 2012, U.S. Appl. No. 13/533,969.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Nov. 26, 2013, U.S. Appl. No. 14/090,667.
Katzer, Robin D., et al., "Trusted Access to Third Party Applications Systems and Methods", filed Jul. 25, 2012, U.S. Appl. No. 13/557,213.
Paczkowski, Lyle W., et al., "Trusted Security Zone Access to Peripheral Devices", filed Jan. 6, 2014, U.S. Appl. No. 14/148,714.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Paczkowski, Lyle W., et al., "Trusted Security Zone Containers for the Protection and Confidentiality of Trusted Service Manager Data", filed Feb. 16, 2014, PCT Application No. PCT/US14/16651.
Paczkowski, Lyle W., et al., "Verifying Applications Using a Trusted Security Zone", filed Aug. 12, 2013, U.S. Appl. No. 13/964,112.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed on Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Cordes, Kevin R., et al., "Digest of Biographical Information for an Electronic Device with Static and Dynamic Portions", filed on Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed on Apr. 4, 2013, U.S. Appl. No. 13/857,139.

(56) References Cited

OTHER PUBLICATIONS

Cordes, Kevin R., et al., "System for Managing a Digest of Biographical Information Stored in a Radio Frequency Identity Chip Coupled to a Mobile Communication Device", filed on Apr. 4, 2013, U.S. Appl. No. 13/857,138.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPS Against Scan-Based Side Channel Attacks," 24th IEEE VLSI Test Symposium. Pub. Date: 2006. http//ieeexplore.ieee.org/stamp/stamp.jsp?tp=&arnumber= 1617569.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
FAIPP Pre-Interview Communication dated Mar. 26, 2015, U.S. Appl. No. 13/939,175, filed Jul. 10, 2013.
Final Office Action dated Mar. 24, 2015, U.S. Appl. No. 13/844,282, filed Mar. 15, 2013.
FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
Paczkowski, Lyle W., et al., "Trusted Code Generation and Verification to Prevent Fraud from Maleficent External Devices that Capture Data," filed Jan. 14, 2015, U.S. Appl. No. 14/596,218.
Notice of Allowance dated May 29, 2015, U.S. Appl. No. 14/085,474, filed Nov. 20, 2013.
FAIPP Pre-Interview Communication dated Jul. 2, 2015, U.S. Appl. No. 14/632,850, filed Feb. 26, 2015.
Notice of Allowance dated Jun. 17, 2015, U.S. Appl. No. 13/571,348, filed Aug. 10, 2012.
Notice of Allowance dated Jun. 9, 2015, U.S. Appl. No. 13/762,319, filed Feb. 7, 2013.
Notice of Allowance dated Aug. 4, 2015, U.S. Appl. No. 14/090,667, filed Nov. 26, 2013.
Notice of Allowance dated Jul. 6, 2015, U.S. Appl. No. 13/844,145, filed Mar. 15, 2013.
Notice of Allowance dated Jul. 6, 2015, U.S. Appl. No. 14/066,661, filed Oct. 29, 2013.
Notice of Allowance dated Aug. 14, 2015, U.S. Appl. No. 13/594,779, filed Aug. 25, 2012.
Final Office Action dated Aug. 27, 2015, U.S. Appl. No. 13/802,404, filed Mar. 13, 2013.
Notice of Allowance dated Jul. 7, 2015, U.S. Appl. No. 13/939,175, filed Jul. 10, 2013.

(56) References Cited

OTHER PUBLICATIONS

Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Aug. 3, 2015, U.S. Appl. No. 13/964,112, filed Aug. 12, 2013.
Notice of Allowance dated Jul. 1, 2015, U.S. Appl. No. 14/075,663, filed Nov. 8, 2013.
Notice of Allowance dated Jul. 22, 2015, U.S. Appl. No. 14/229,532, filed Mar. 28, 2014.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139, filed Apr. 4, 2013.
Notice of Allowance dated Jun. 11, 2015, U.S. Appl. No. 13/857,138, filed Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.

* cited by examiner

NETWORK BASED TEMPORARY TRUST EXTENSION TO A REMOTE OR MOBILE DEVICE ENABLED VIA SPECIALIZED CLOUD SERVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network capable electronic devices are becoming increasingly prevalent in our daily lives. More and more electronic devices that did not have network capabilities are now built to be network capable. Cloud computing (network computing) where a program or application runs on a connected server or servers instead of on a local computing device is evolving into an era when high speed media content exchange is more and more involved in cloud computing systems.

SUMMARY

In an embodiment, a method of executing a trusted application on a trusted security zone enabled electronic device is disclosed. The method comprises examining a provisioning status of a trusted security subzone on the electronic device, and responsive to a trusted security subzone not being provisioned on the electronic device, generating, by a server, a temporary trust token. The method further comprises transmitting the temporary trust token to the electronic device, comparing the temporary trust token with a plurality of trust tokens stored in the electronic device to determine the trustworthiness of the temporary trust token, and responsive to the temporary trust token being determined to be trustworthy, provisioning the non-provisioned trusted security subzone on the electronic device to be a temporary trust enablement. The method further comprises transmitting the trusted application through an encrypted channel to the temporary trust enablement, executing the trusted application in the temporary trust enablement, and removing the trusted application, the temporary trust enablement, and the temporary trust token when the trusted application is completed.

In an embodiment, a method of executing a trusted application on a mobile communication device without a trusted security zone hardware partition is disclosed. The method comprises examining a provisioning status of a trusted security subzone on the mobile communication device, and responsive to no trusted security zone hardware partition being found on the mobile communication device, generating, by a server, an encrypted key. The method further comprises transmitting the encrypted key to the mobile communication device, comparing the encrypted key with a plurality of trust keys stored in the mobile communication device to determine the trustworthiness of the encrypted key, and responsive to the encrypted key being determined to be trustworthy, installing a temporary trust enablement application on the mobile communication device. The method further comprises transmitting the trusted application through an encrypted channel to the temporary trust enablement, blocking, by the temporary trust enablement, at least part of a processor of the mobile communication device every other predefined number of clock cycles to execute the trusted application, and restricting the trusted application to a subset of application programming interfaces (API) and hardware peripherals of the mobile communication device. The method further comprises releasing the at least part of the processor when the trusted application is completed and removing the trusted application, the temporary trust enablement, and the encrypted key when the trusted application is completed.

In an embodiment, a method of installing and uninstalling a trusted application on an electronic device without a trusted security zone hardware partition is disclosed. The method comprises examining a provisioning status of a trusted security subzone on the electronic device, and responsive to no trusted security zone hardware partition being found on the electronic device, installing a temporary trust enablement application on the electronic device. The method further comprises transmitting the trusted application through an encrypted channel to the temporary trust enablement and blocking, by the temporary trust enablement, at least part of a processor of the electronic device to execute the trusted application. The method further comprises releasing the at least part of the processor when the trusted application is completed, and removing the trusted application when the trusted application is completed.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
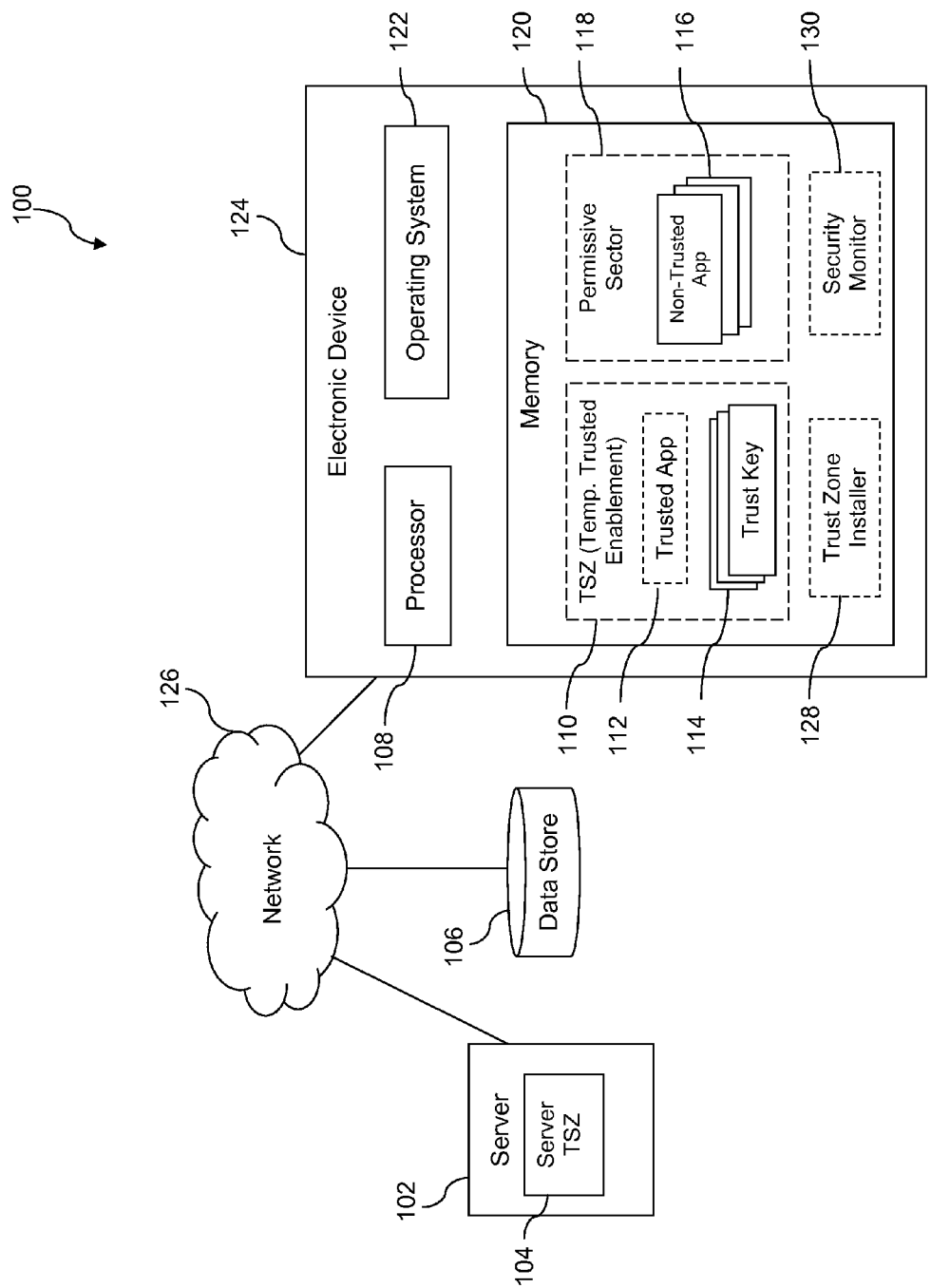
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

With the rapid development of media creation and content distribution via wireless communication networks through cloud computing systems (Cloud), concerns are rising over security throughout the cloud systems. For example, content distribution through cloud computing systems may be unsecure and unsafe. When confidential, privacy related, and/or premium content related services are delivered through a cloud computing system, safe and secure services may be desirable. Some of these services may not desire as high security as financial transactions, medical records, or the like, but may desire higher level of secure execution than normal applications. For example, charged online gaming services, premium media streaming services, web album services, or the like, may desire some level of secure services across the cloud computing systems.

Mobile communication devices with a trusted security zone hardware partition may perform secure execution of applications with server computers maintained by a wireless communications service provider or a wireless carrier that is a home carrier for the mobile communication device. However, electronic devices, other than mobile communication devices, may not be equipped with a trusted security zone hardware partition. Those electronic devices may not be able to perform secure execution of applications or data exchange, especially with server computers maintained by a non-home carrier. The present disclosure teaches a system and method for installing a temporary trust enablement application on an electronic device for secure execution of trusted applications.

For example, a provisioning status of trusted security subzone(s) on an electronic device may be examined by a server trusted security zone on the server or by a trusted application in the server trusted security zone on the server when the electronic device requests services from the server, where those services desire secure execution or data exchange. The electronic device and the server may communicate with each other through a wired network, a wireless network, or some combination of the two. The server may be maintained by a home carrier of the electronic device or not. Based on whether or not a non-provisioned trusted security subzone is detected on the electronic device, the server may perform a variety of actions.

For example, when no trusted security zone hardware partition has been found on the electronic device, an encrypted key may be generated by the server. The encrypted key may be transmitted to the electronic device by the server. At the electronic device, the encrypted key may be compared with a plurality of stored trust keys by a kernel of an operating system of the electronic device or by a relevant application in the operating system of the electronic device to determine the trustworthiness of the encrypted key. The plurality of stored trust keys may have been generated and transmitted to the electronic device before the electronic device requested the service. The kernel of the operating system may be requested by the server to perform a variety of action for secure execution of a trusted application related to the service the electronic device requested from the server. When the encrypted key is determined by the electronic device to be trustworthy, a temporary trust enablement application may be installed by the server on the electronic device. The temporary trust enablement application may be a software application and may be executed by a processor of the electronic device. The trusted application may be transmitted by the server through an encrypted channel to the temporary trust enablement application on the electronic device.

The trusted application may be executed in the temporary trust enablement. The trusted application may be restricted to a subset of application programming interfaces (APIs) and hardware peripherals of the electronic device. Access to at least part of the processor may be blocked to other untrusted applications while the trusted application is executed. The at least part of the processor that was blocked while the trusted application was executed may be released when the trusted application execution is completed, for example when the premium media streaming is completed. The trusted application, the temporary trust enablement, and the encrypted key may be removed when the trusted application is completed.

On the other hand, when the electronic device requests services from the server, wherein those services desire secure execution, and when at least one trusted security subzone that has not been provisioned is found on the electronic device, a temporary trust token may be generated by the server. The electronic device may comprise more than one trusted security subzone, wherein some of the trusted security subzone may have been provisioned. When at least one trusted security subzone that has not been provisioned is found, a temporary trust token may be generated by the server. The temporary trust token may be transmitted to the electronic device after the temporary trust token has been generated by the server. The temporary trust token may be compared by a trusted security zone installer on the electronic device with a plurality of stored trust tokens to determine the trustworthiness of the temporary trust token. The plurality of stored trust keys may have been generated and transmitted to the electronic device before the electronic device requested the service. When the temporary trust token is determined to be trustworthy by the trusted security zone installer, the trusted security zone installer may transmit a notification to the server indicating that the trusted security subzone is ready to be provisioned. The server may then provision the non-provisioned trusted security subzone to be a temporary trust enablement, for example by transmitting a notification to the trusted security zone installer requesting the trusted security zone installer to provision the non-provisioned trusted security subzone into a temporary trust enablement.

After the non-provisioned trusted security subzone is provisioned with the temporary trust enablement, the trusted security zone installer may transmit a message or notification to the server indicating the temporary trust enablement is ready to receive a trusted application relevant to the service the electronic device requested. The server may then transmit the trusted application through an encrypted channel to the temporary trust enablement. The trusted application may be executed in the temporary trust enablement in a way similar to how a trusted application is executed in a trusted security zone, except that the trusted application has restricted access to a subset of APIs and hardware peripherals of the electronic device. The trusted application, the temporary trust enablement, and the temporary trust token may be removed when the trusted application is completed.

Turning now to FIG. 1, a communication system 100 is described. In an embodiment, the communication system 100 comprises a plurality of electronic devices 124, a data store 106, and a server 102. The server 102 may comprise a server trusted security zone 104. The electronic device 124 may comprise a processor 108, an operating system 122, and a memory 120. The memory 120 may comprise a trusted security zone portion 110 and a permissive sector 118. The trusted security zone 110 may be a trusted security subzone 110. Said in other words, the memory 120 may comprise more than one trusted security subzone 110 instead of only one trusted security zone 110. The trusted security zone 110 may comprise a plurality of trusted applications 112 and a plurality of trust keys 114. The permissive sector 118 may comprise a plurality of non-trusted applications 116. The electronic device 124 may be configured to establish a wireless or wired communication link with a network 126. The server 102 and the data store 106 may also have access to the network 126. The network 126 may comprise any combination of private and public networks.

It is understood that the system 100 may comprise any number of electronic devices 124, any number of data stores 106, and any number of servers 102. The electronic device 124 may be any of a server computer, a desktop computer, a laptop computer, a notebook computer, a tablet computer, a mobile phone, a personal digital assistant (PDA), a media player, a headset computer, a wearable computer, a game console, an Internet digital media streaming device, a television, or another network/communications capable device. The server 102 and the data store 106 may be server computers. The server 102 and the data store 106 may locate in one computer—for example a server computer, in two different computers—for example, a server computer for the server 102 and another computer for the data store 106, in multiple different computers—for example, multiple server computers for the server 102 and other multiple computers for the data store 106, or in some other combination of computers. When the server 102 and the data store 106 do not locate in one computer, the server 102 and the data store 106 may share the same wired or wireless local area network.

Non-trusted applications 116 are normal applications in the electronic device 124. When trusted applications 112 are executed in the trusted security zone 110 or a temporary trust enablement of the electronic device 124, peripherals and data of the electronic device 124 may not be accessible to the non-trusted applications 116. The non-trusted applications 116 may be stored in a permissive sector 118 in the memory 120. The permissive sector 118 of the memory 120 is the normal partition in the memory 120. When the memory 120 is not partitioned into trusted security zone(s) 110 and a permissive sector 118, the non-trusted applications 116 may be stored in the memory 120. Additionally, non-secure resources may be stored in the permissive sector 118 in the memory 120.

The server trusted security zone 104 may be stored in a memory of the server 102. The server trusted security zone 104 may communicate, manage, and/or manipulate the trusted security zone 110 on the electronic device 124. For example, the server trusted security zone 104 may provision the trusted security zone 110 to be a temporary trust enablement under predefined circumstances. After the trusted security zone 110 is provisioned to be the temporary trust enablement, the server trusted security zone 104 may communicate with relevant application(s) on the electronic device 124 and/or manage the temporary trust enablement.

For example, a security monitor 130 on the electronic device 124 may ask the server trusted security zone 104 about the trustworthiness of the temporary trust enablement. The server trusted security zone 104 or a trusted application in the server trusted security zone 104 may communicate with the security monitor 130 on the electronic device 124 to assure that the temporary trust enablement is trusted or deny that the temporary trust enablement is trusted based on the trustworthiness of the temporary trust enablement. When the temporary trust enablement is determined to be trustworthy, the server trusted security zone 104 may transmit a trusted application 112 to the electronic device 124. During the execution of the trusted application 112 on the electronic device 124, the server trusted security zone 104 and/or the security monitor 130 may monitor the status of the trusted application 112 and communicate with each other about the status of the trusted application 112.

In an embodiment, the trusted security zone 110 is more than just a segment of memory. The trusted security zone 110 may also have a dimension of processing. The trusted security zone 110 may be enabled but not provisioned at the original equipment manufacturer (OEM). When provisioned, for example at the OEM, the trusted security zone 110 may provide the secure execution environment for trusted applications 112 where only trusted applications 112 may operate, safe from attacks. The trusted security zone 110 may be implemented by partitioning both hardware and software resources of the electronic device 124 into two partitions: a secure partition and a normal partition. The secure partition may be implemented by a distinct, separate, or dedicated physical processor, usually the first processor, from the processor by which the normal partition may be implemented, usually the second processor. Alternatively, the secure partition may be implemented by a distinct, separate, or dedicated virtual processor from the virtual processor by which the normal partition may be implemented. A server trusted security zone 104 may be a server-side trusted security zone and may communicate with the trusted security zone 110.

When the trusted security zone 110 is not provisioned at the OEM, the trusted security zone 110 may be provisioned, for example by the server 102, to be a temporary trust enablement after the electronic device 124 reaches the customer side under predefined circumstances. A temporary trust enablement may perform a variety of functionality similar to a trusted security zone 110 except that a trusted application 112 in the temporary trust enablement may have restricted access to a subset of application programming interfaces (API) and hardware peripherals of the electronic device 124. Also, the temporary trust enablement, unlike a trusted security zone 110, may be allowed to exist for a limited period of time and may be removed after the execution of the trusted application 112 is completed.

In an embodiment, provisioning status of trusted security subzone(s) 110 on the electronic device 124 may be examined by the server 102, for example by the server trusted security zone 104 or by a trusted application in the server trusted security zone 104 on the server 102, under predefined circumstances. For example, the provisioning status of trusted security subzone(s) 110 may be examined after the electronic device 124 requests premium media content download or another service from the server 102. The application in the server trusted security zone 104 may transmit a message to the operating system 122 of the electronic device 124 to inquire about the provisioning status of trusted security subzone(s) 110 on the electronic device 124. The server trusted security zone 104 may take different action depending on the provisioning status of the trusted security subzone(s) 110 on the electronic device 124.

For example, when at least one trusted security (sub)zone 110 is found to not have been provisioned on the electronic device 124, a temporary trust token may be generated by the server 102. The temporary trust token may be transmitted to the electronic device 124 by the server 102. The temporary trust token may be compared by a trusted security zone installer 128 on the electronic device 124 or some other relevant trusted application in the trusted security zone hardware partition with a plurality of trust tokens or trust keys 114 stored on the electronic device 124 to determine the trustworthiness of the temporary trust token. The trust keys 114 may be stored in the same trusted security (sub)zone 110 that has been found to not be provisioned. If the temporary trust token matches any of the stored trust keys 114, the temporary trust token may be determined to be trustworthy. The trusted security zone installer 128 may transmit a notification to the server 102 indicating that the non-provisioned trusted security (sub) zone 110 is ready to be provisioned after the temporary trust token has been determined to be trustworthy.

The non-provisioned trusted security (sub)zone 110 on the electronic device 124 may be provisioned to be a temporary trust enablement by the server 102. For example, the server 102 may transmit a message or notification of provisioning the temporary trust enablement to the trusted security zone installer 128 on the electronic device 124. The provisioned temporary trust enablement may be referred to as the temporary trust enablement 110 hereinafter. After the temporary trust enablement 110 is provisioned on the electronic device 124, a trusted application 112 may be transmitted by the server 102 through an encrypted channel to the temporary trust enablement 110, for example the trusted application 112 may be encrypted and then sent to the temporary trust enablement 110. The trusted application 112 may be an application that renders the service requested by the electronic device 124 or an application among a plurality of applications that cooperate to render the service requested by the electronic device 124. The trusted application 112 may be stored in the temporary trust enablement 110 in the memory 120 and may be executed in the temporary trust enablement 110.

When the trusted application 112 is executed, only trusted application(s) 112 may operate and non-trusted applications may be prohibited from executing. Security may be further promoted by restricting access of non-trusted applications to peripherals, such as data inputs and data outputs, while the trusted application 112 is running in the temporary trusted enablement 110. The temporary trust enablement 110 may be monitored by the security monitor 130 application. For example, the security monitor 130 may monitor the execution status of the trusted application 112 and/or may communicate with the server trusted security zone 104 about the observed execution status of the trusted application 112.

When the trusted application 112 is executed in the temporary trust enablement, access to at least part of the processor 108 may be blocked, for example to non-trusted applications 116. In an embodiment, instead of executing the trusted application continuously, the trusted application 112 may be executed in a discrete manner, for example every other predefined number of clock cycles of the electronic device 124. The operating system 122 of the electronic device 124 may be suspended when the trusted application 112 is executed. However, some operating system 122 interrupt routines may still interrupt the execution of the trusted application 112, for example incoming phone rings.

The trusted application 112 may have restricted access to a subset of APIs and hardware peripherals of the electronic device 124. For example, the trusted application 112 may have restricted access to input and output ports of the electronic device 124 related to video streaming when the trusted application 112 is an application related to premium video streaming services. For example, the trusted application 112 may be an application that downloads premium media content from the server 102 or the data store 106. The trusted application 112 may be an application that uploads private media content to the server 102 or the data store 106. The trusted application 112 may be an application that provides charged online gaming services. The trusted application 112 may be an application that provides building access credentials. The trusted application 112 may be an application that provides web album services, or the like. The trusted application 112, the temporary trust enablement 110, and the temporary trust token may be removed when the trusted application 112 is execution completed, for example when the premium video streaming is completed.

On the other hand, if no trusted security zone hardware partition is found on the electronic device 124 when the provisioning status of trusted security subzone(s) 110 on the electronic device 124 is examined by the server 102, an encrypted key may be generated by the server 102. When no trusted security zone hardware partition is found on the electronic device 124, the memory 120 may comprise only a permissive sector. A kernel of the operating system 122 may be utilized to block the at least part of the processor 108 when a trusted application transmitted to the electronic device 124 is executed. The server 102 may interrogate the electronic device 124 to determine which suspend modes of the processor 108 the kernel of the operating system 122 supports. When the suspend modes are determined and transmitted back to the server 102, the server 102 may transmit the encrypted key to the electronic device 124.

The encrypted key may be compared with a plurality of stored trust keys 114 to determine the trustworthiness of the encrypted key, for example by the kernel of the operating system 122 of the electronic device 124 or by a relevant application in the operating system 122. The trusted keys 114 may be stored in the memory 120 of the electronic device 124. When the encrypted key matches any of the plurality of the stored trust keys 114, the encrypted key may be determined to be trustworthy. The operating system 122 or the application in environment supported by the operating system 122 may transmit a notification or message to the server 102 indicating that the electronic device 124 is ready to be installed with a temporary trust enablement application after the encrypted key is determined to be trustworthy. The temporary trust enablement application may be installed on the electronic device 124 by the server 102. For example, the server 102 may transmit a notification to the operating system 122 to request the operating system 122 or the application in the operating system 122 to install the temporary trust enablement application. The temporary trust enablement application may be a software application and may be executed by the processor 108.

A trusted application 112 may be transmitted by the server 102 through an encrypted channel to the temporary trust enablement application on the electronic device 124. Access to at least part of the processor 108 of the electronic device 124 may be blocked, for example to non-trusted applications 116, by the temporary trust enablement when the trusted application 112 is executed. The trusted application 112 may not execute continuously. Instead, the trusted application 112 may be executed every other predefined number of clock cycles of the electronic device 124. Thus, the at least part of the processor 108 may be blocked every other predefined number of clock cycles while the trusted application 112 is executed. However, some operating system 122 interrupt routines may still interrupt the execution of the trusted application 112, for example incoming phone rings. The trusted application 112 may be restricted to a subset of APIs and hardware peripherals of the electronic device 124.

The temporary trust enablement application may block access to the at least part of the processor 108 to non-trusted applications 116 while the trusted application 112 is executed. Alternatively, the kernel of the operating system 122 may be utilized by the temporary trust enablement to block the at least part of the processor 108. The at least part of the processor 108 that was blocked while the trusted application was executed may be released when the trusted application 112 execution is completed. The trusted application 112, the temporary trust enablement, and the encrypted key may be removed when the trusted application 112 execution is completed. When a second trusted application is about to be executed on the electronic device 124, a second encrypted key may be generated by the server 102 and transmitted to the electronic device 124 for trustworthiness validation.

Figure 2:
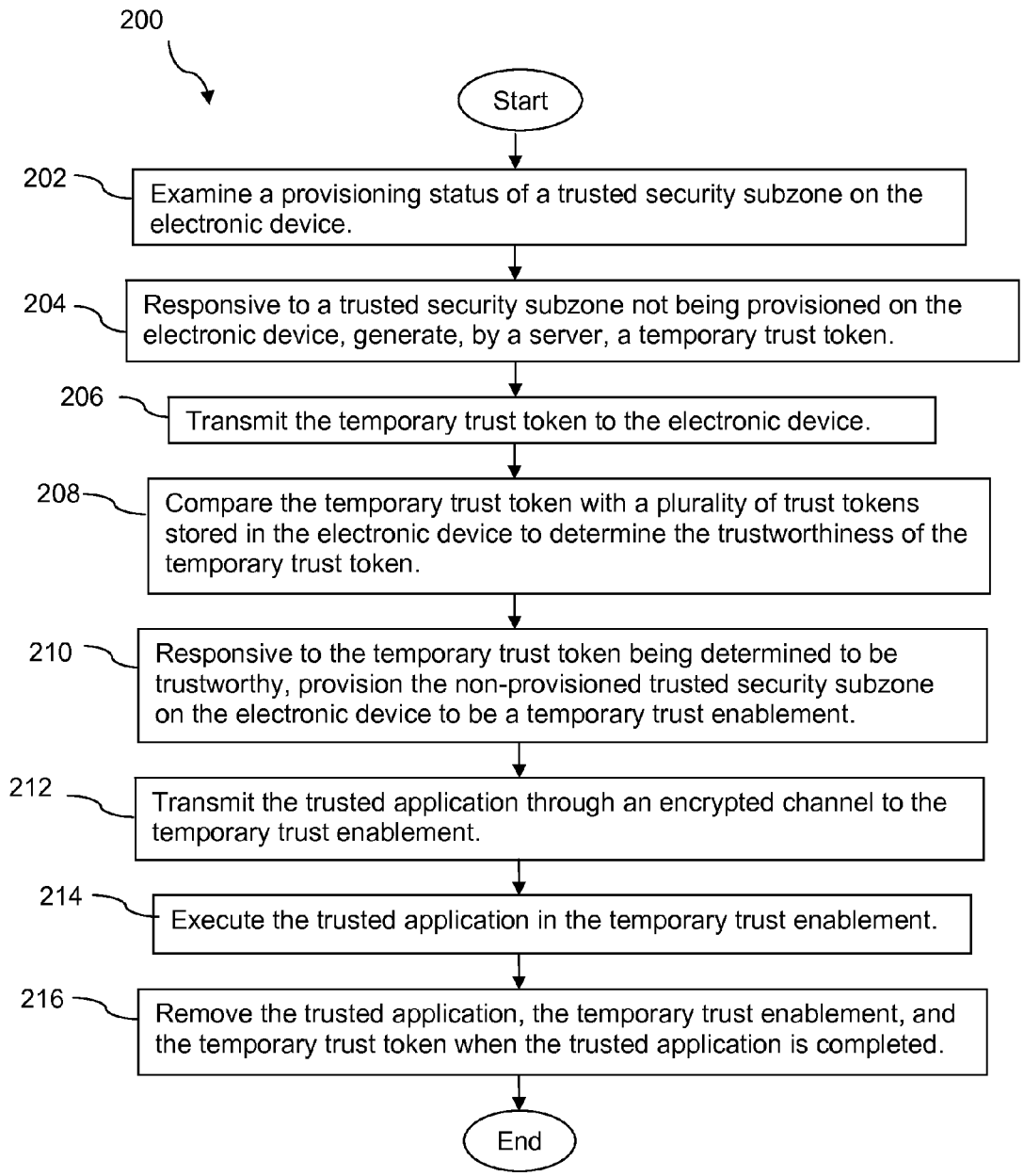
FIG. 2 is a flow chart illustrating a method according to an embodiment of the disclosure.

Turning now to FIG. 2, a method 200 is described. At block 202, a provisioning status of a trusted security subzone on the electronic device is examined. For example, provisioning statuses of trusted security subzones 110 on the electronic device 124 may be examined by the server 102. At block 204, responsive to a trusted security subzone not being provisioned on the electronic device, a temporary trust token is generated by a server. For example, when a trusted security subzone 110 is found to have not been provisioned on the electronic device 124, a temporary trust token may be generated by the server 102, for example by the server trusted security zone 104 or a trusted application in the server trusted security zone 104. At block 206, the temporary trust token is transmitted to the electronic device 124.

At block 208, the temporary trust token is compared with a plurality of trust tokens stored in the electronic device to determine the trustworthiness of the temporary trust token. For example, the temporary trust token may be compared with a plurality of stored trust tokens or trust keys 114 to determine the trustworthiness of the temporary trust token. The stored trust keys 114 may have been transmitted from the server 102 to the electronic device 124 before examining the provisioning status of trusted security subzones 110 on the electronic device 124. For example, when the user or owner of an electronic device 124 travels to a building and desires access to the building, a trusted application may be installed on the electronic device 124 for the building access. Before the user of the electronic device 124 arrives at the building, the server 102 may transmit at least one trust key to the electronic device 124. The trust key(s) from the server 102 may be stored in non-provisioned trusted security subzone(s) 110.

At block 210, responsive to the temporary trust token being determined to be trustworthy, the non-provisioned trusted security subzone 110 on the electronic device 124 is provisioned to be a temporary trust enablement 110. At block 212, the trusted application 112 is transmitted through an encrypted channel to the temporary trust enablement 110. At block 214, the trusted application 112 is executed in the temporary trust enablement 110. At block 216, the trusted application 112, the temporary trust enablement 110, and the temporary trust token are removed when the trusted application is completed.

Figure 3:
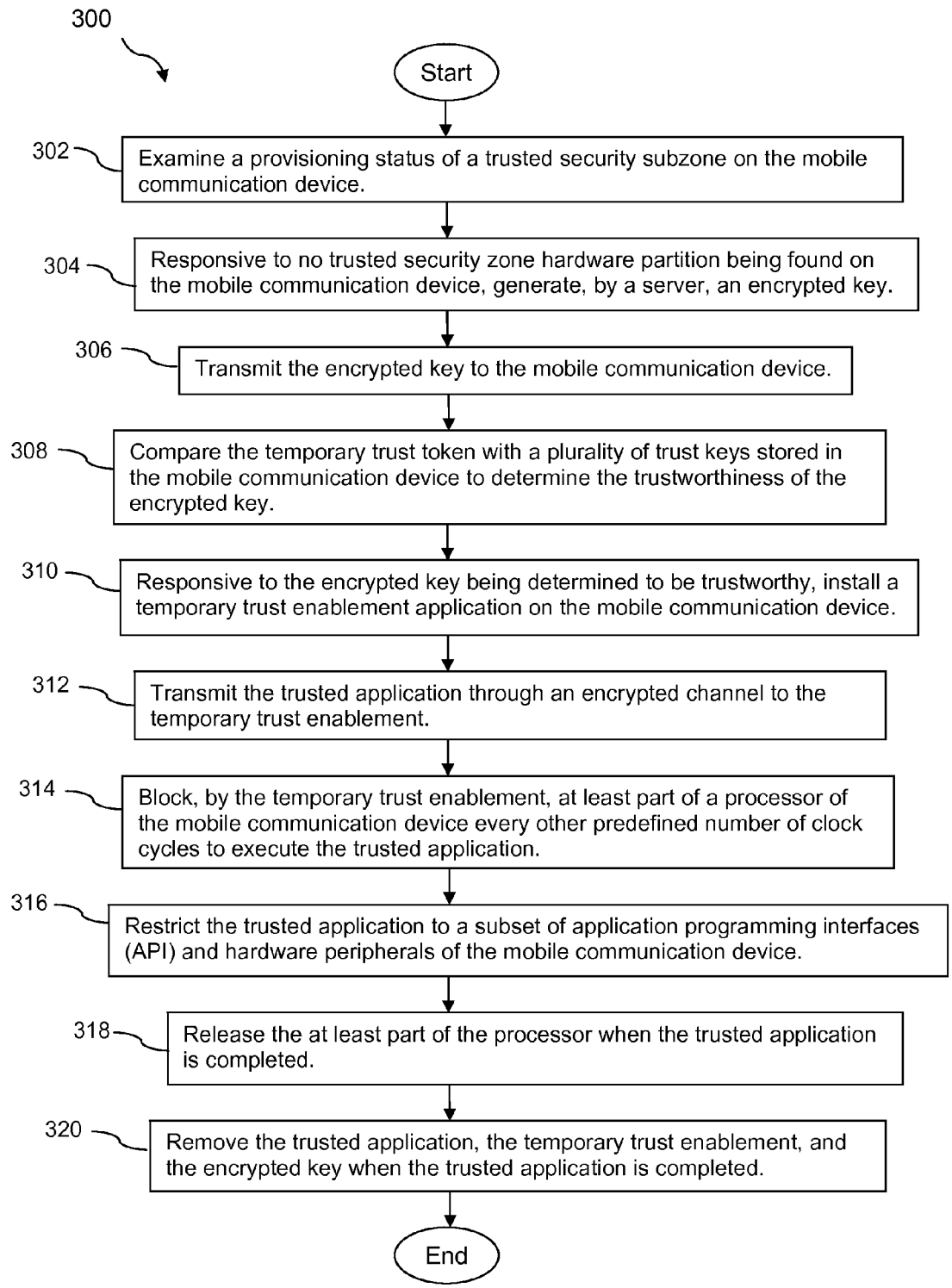
FIG. 3 is a flow chart illustrating another method according to an embodiment of the disclosure.

Turning now to FIG. 3, a method 300 is described. At block 302, a provisioning status of a trusted security subzone on the mobile communication device 124 is examined. In FIG. 3, the mobile communication device 124 may be referred to as a mobile communication device 124. At block 304, responsive to no trusted security zone hardware partition being found on the mobile communication device 124, an encrypted key is generated by a server 102. At block 306, the encrypted key is transmitted to the mobile communication device 124.

At block 308, the temporary trust token is compared with a plurality of trust keys 114 stored in the mobile communication device to determine the trustworthiness of the encrypted key. At block 310, responsive to the encrypted key being determined to be trustworthy, a temporary trust enablement application is installed on the mobile communication device 124. At block 312, the trusted application 112 is transmitted through an encrypted channel to the temporary trust enablement.

At block 314, at least part of a processor 108 of the mobile communication device 124 is blocked by the temporary trust enablement every other predefined number of clock cycles to execute the trusted application 112. At block 316, the trusted application 112 is restricted to a subset of application programming interfaces (API) and hardware peripherals of the mobile communication device 124. At block 318, the at least part of the processor 108 is released when the trusted application 112 is completed. At block 320, the trusted application 112, the temporary trust enablement, and the encrypted key are removed when the trusted application 112 is completed.

Figure 4:
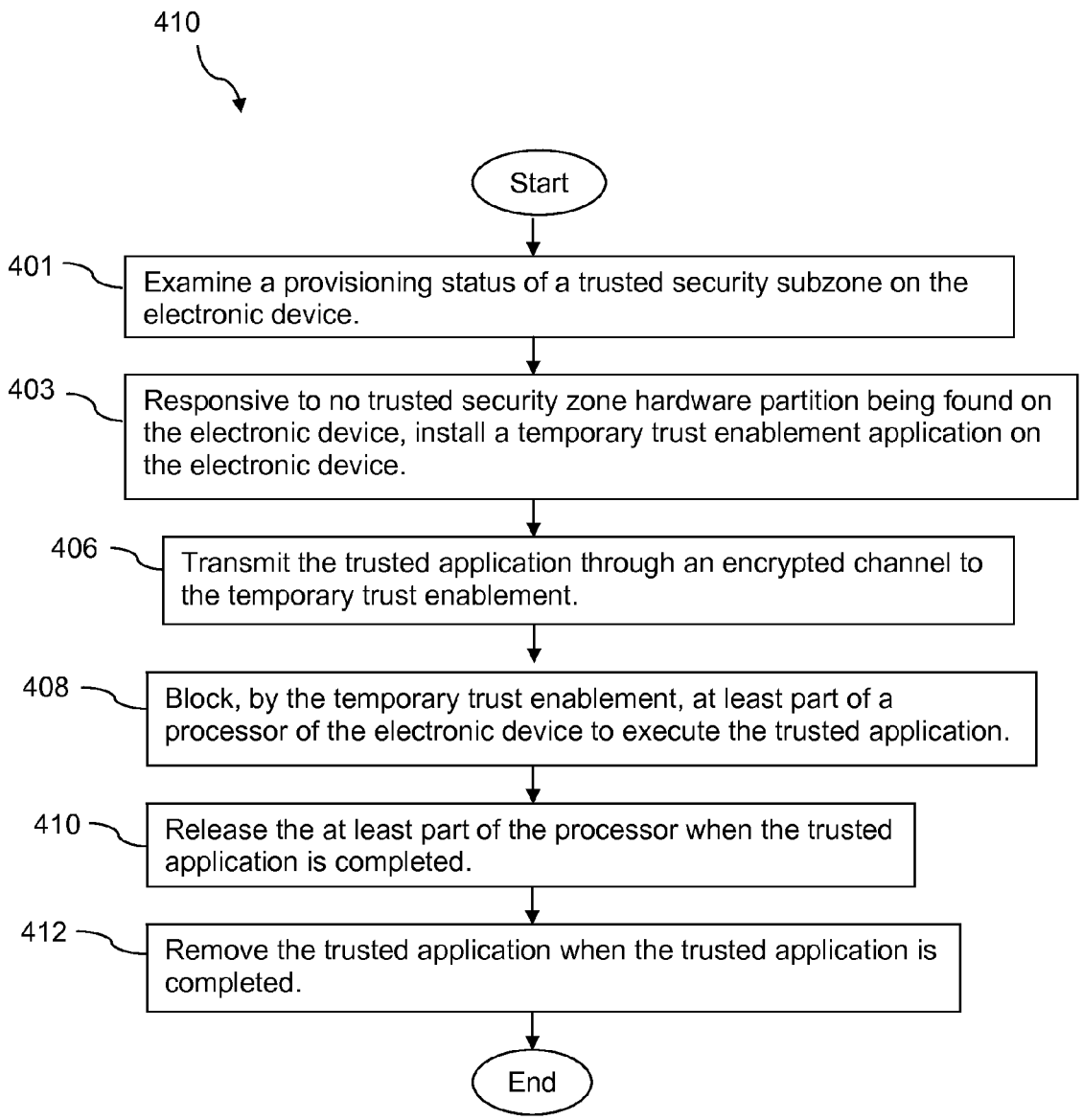
FIG. 4 is flow chart illustrating a third method according to an embodiment of the disclosure.

Turning now to FIG. 4, a method 410 is described. At block 401, a provisioning status of a trusted security subzone on the electronic device 124 is examined. At block 403, responsive to no trusted security zone hardware partition being found on the electronic device 124, a temporary trust enablement application is installed on the electronic device 124. At block 406, the trusted application 112 is transmitted through an encrypted channel to the temporary trust enablement. At block 408, at least part of a processor 108 of the electronic device 124 is blocked by the temporary trust enablement to execute the trusted application 112. At block 410, the at least part of the processor 108 is released when the trusted application 112 is completed. At block 412, the trusted application 112 is removed when the trusted application 112 is completed.

Figure 5:
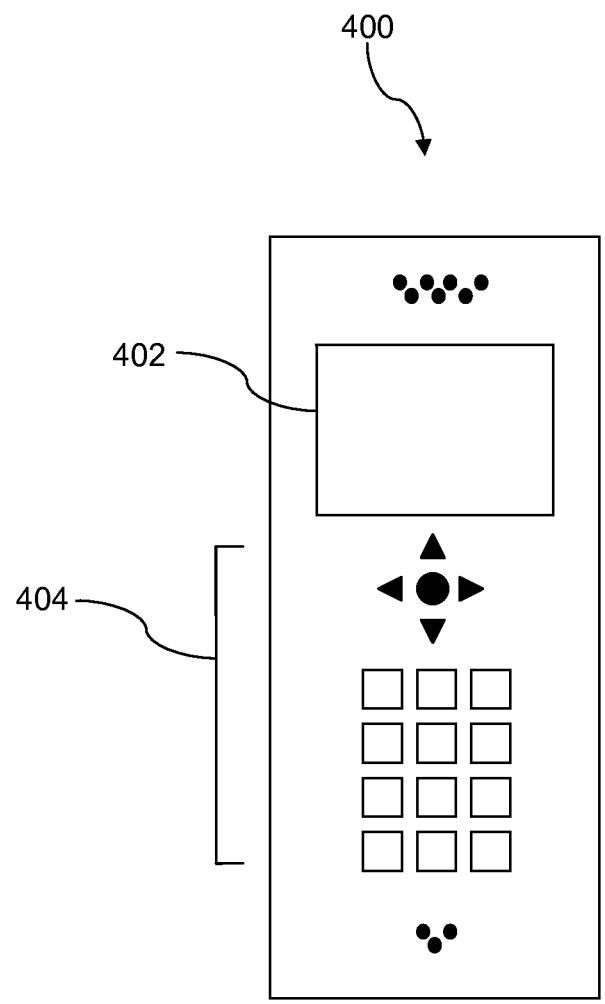
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
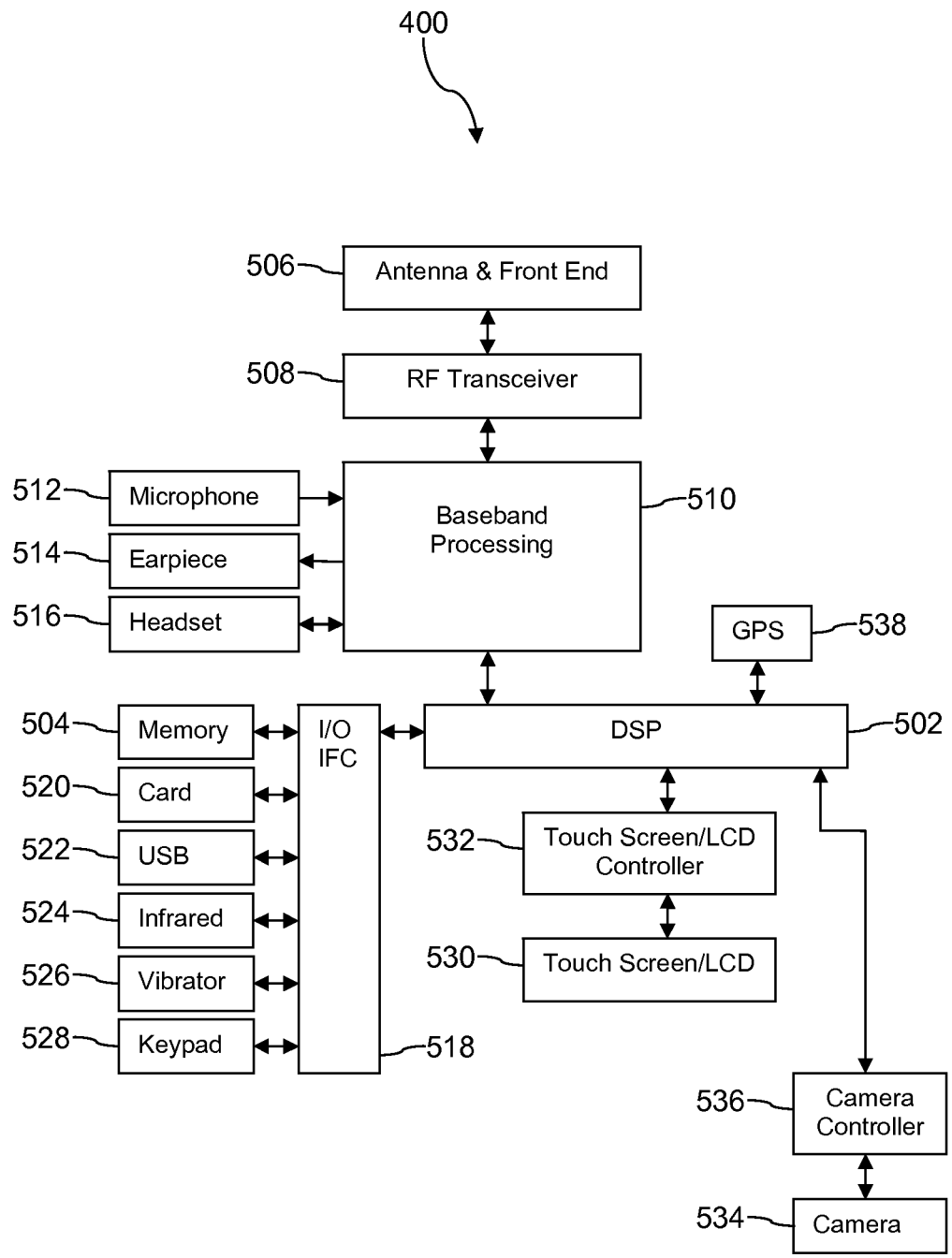
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
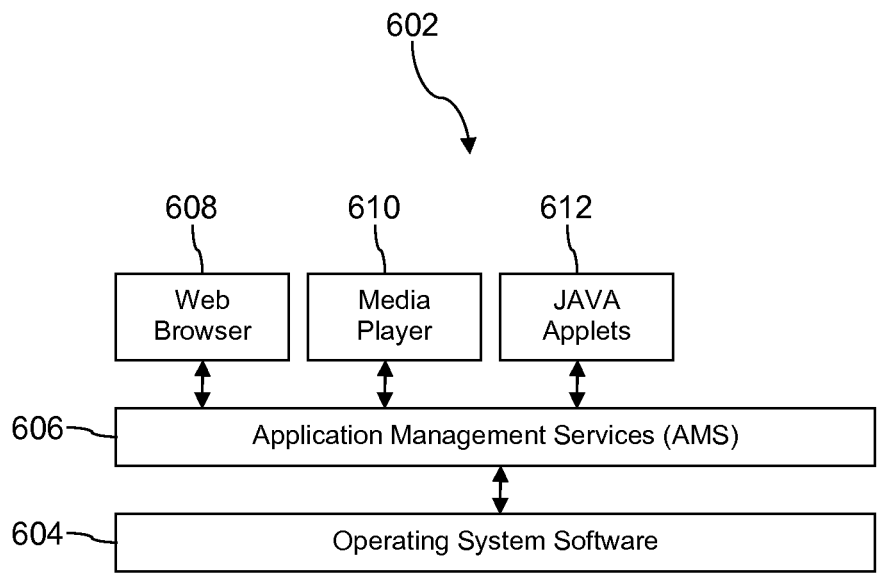
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
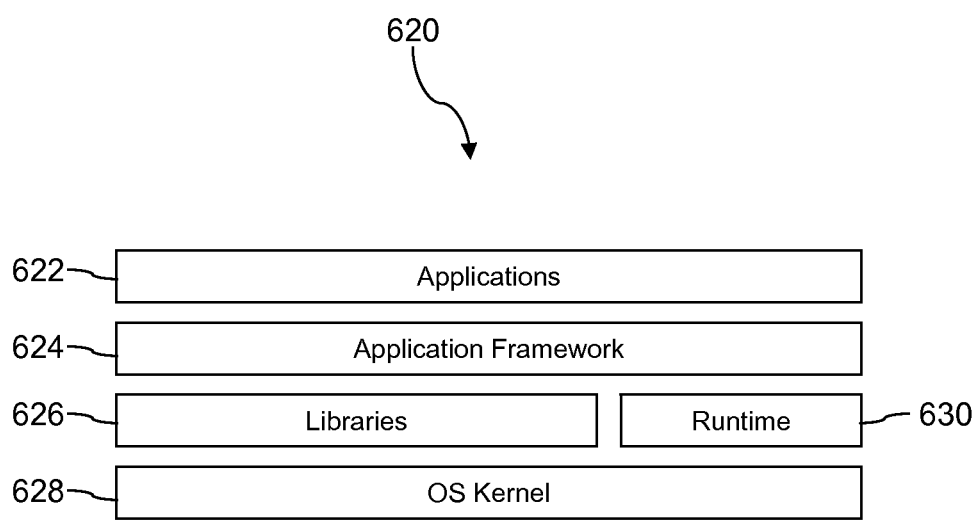
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete Trusted Execution Environment (TEE) may be implemented through the use of the trusted security zone hardware and software architecture. The Trusted Execution Environment is an execution environment that is parallel to the execution environment of the main mobile device operating system. The Trusted Execution Environment and/or the trusted security zone may provide a base layer of functionality and/or utilities for use of applications that may execute in the trusted security zone. For example, in an embodiment, trust tokens may be generated by the base layer of functionality and/or utilities of the Trusted Execution Environment and/or trusted security zone for use in trusted end-to-end communication links to document a continuity of trust of the communications. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution Environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 8:
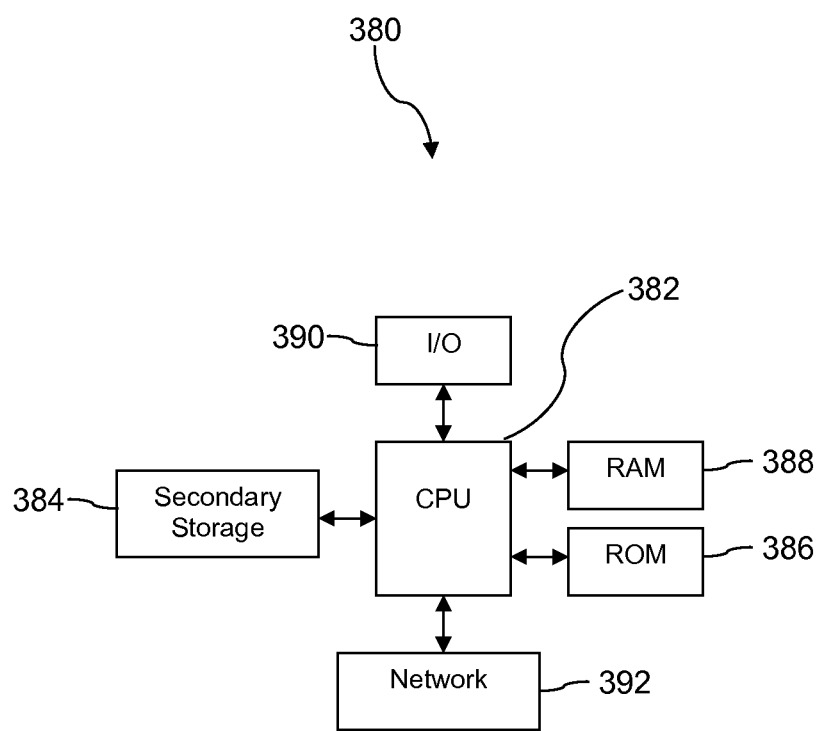
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of executing a trusted application on a trusted security zone enabled electronic device, comprising:
    examining a provisioning status of a trusted security subzone on the electronic device;
    responsive to a trusted security subzone not being provisioned on the electronic device, generating, by a server, a temporary trust token;
    transmitting the temporary trust token to the electronic device;
    comparing the temporary trust token with a plurality of trust tokens stored in the electronic device to determine the trustworthiness of the temporary trust token;
    responsive to the temporary trust token being determined to be trustworthy, provisioning the non-provisioned trusted security subzone on the electronic device to be a temporary trust enablement;
    transmitting the trusted application through an encrypted channel to the temporary trust enablement;
    executing the trusted application in the temporary trust enablement, wherein the temporary trust enablement selectively blocks at least part of a processor of the electronic device to execute the trusted application, and wherein the trusted application has restricted access to a subset of application programming interfaces and hardware peripherals of the electronic device;
    releasing the at least part of the processor when the trusted application is completed; and
    removing the trusted application, the temporary trust enablement, and the temporary trust token when the trusted application is completed.

2. The method of claim 1, further comprising, monitoring, by a security monitor application, the temporary trust enablement.

3. The method of claim 1, wherein the trusted application is an application that downloads premium media content from the server.

4. The method of claim 1, wherein the trusted application is an application that uploads private media content to the server.

5. The method of claim 1, wherein the processor of the electronic device operates at a clock speed based on a predefined number of clock cycles, and the trusted application is executed in the temporary trust enablement during every other clock cycle.

6. The method of claim 5, wherein an operating system of the electronic device is suspended when the trusted application is executed.

7. A method of executing a trusted application on a mobile communication device without a trusted security zone hardware partition, comprising:
    examining a provisioning status of a trusted security subzone on the mobile communication device;
    responsive to no trusted security zone hardware partition being found on the mobile communication device, generating, by a server, an encrypted key;
    transmitting the encrypted key to the mobile communication device;
    comparing the encrypted key with a plurality of trust keys stored in the mobile communication device to determine the trustworthiness of the encrypted key;
    responsive to the encrypted key being determined to be trustworthy, installing a temporary trust enablement application on the mobile communication device;
    transmitting the trusted application through an encrypted channel to the temporary trust enablement;
    blocking, by the temporary trust enablement, at least part of a processor of the mobile communication device every other predefined number of clock cycles to execute the trusted application;
    restricting the trusted application to a subset of application programming interfaces and hardware peripherals of the mobile communication device;
    releasing the at least part of the processor when the trusted application is completed; and
    removing the trusted application, the temporary trust enablement, and the encrypted key when the trusted application is completed.

8. The method of claim 7, further comprising, monitoring, by a server trusted security zone on the server, the temporary trust enablement application.

9. The method of claim 7, wherein a kernel of an operating system of the electronic device is utilized by the temporary trust enablement to block the at least part of the processor.

10. The method of claim 9, wherein the server interrogates the electronic device to determine which suspend modes of the processor the kernel supports.

11. The method of claim 10, wherein when the suspend modes is determined, the server transmits the encrypted key to the electronic device.

12. The method of claim 7, wherein the server trusted security zone installs the temporary trust enablement application on the electronic device.

13. The method of claim 7, wherein the electronic device is one of a server computer, a desktop computer, a laptop computer, a notebook computer, a tablet computer, a mobile phone, a personal digital assistant, a media player, a headset computer, a wearable computer, a game console, an Internet digital media streaming device, a television, or another network/communications capable device.

* * * * *